United States Patent [19]

Ise et al.

[11] Patent Number: 5,563,966
[45] Date of Patent: Oct. 8, 1996

[54] METHOD AND APPARATUS FOR PROCESSING CODED IMAGE DATA

[75] Inventors: Hirotoshi Ise, Yokohama; Yoshihito Ohara, Odawara, both of Japan

[73] Assignee: Hitachi, Ltd., Tokyo, Japan

[21] Appl. No.: 502,270

[22] Filed: Jul. 13, 1995

Related U.S. Application Data

[63] Continuation of Ser. No. 979,273, Nov. 20, 1992, abandoned.

[30] Foreign Application Priority Data

Nov. 22, 1991 [JP] Japan .................................. 3-307375

[51] Int. Cl.⁶ .............................. H04N 1/21; G06K 9/36; G06K 9/20
[52] U.S. Cl. .......................... 382/317; 382/232; 358/403
[58] Field of Search .................................. 382/317, 232; 358/402, 403, 408

[56] References Cited

U.S. PATENT DOCUMENTS

| | | | |
|---|---|---|---|
| 4,352,012 | 9/1982 | Verderber et al. | 398/403 |
| 4,408,181 | 10/1983 | Nakayama | 382/61 |
| 4,553,261 | 11/1985 | Froessl | 382/61 |
| 4,757,348 | 7/1988 | Rourke et al. | 364/525 |
| 4,941,170 | 7/1990 | Herbst | 358/402 |
| 5,161,037 | 11/1992 | Saito | 358/468 |
| 5,227,893 | 7/1993 | Ett | 358/403 |
| 5,247,591 | 9/1993 | Baran | 358/402 |

FOREIGN PATENT DOCUMENTS 248169  11/1986  Japan .............................. G06F 15/64

Primary Examiner—Leo Boudreau
Assistant Examiner—Monica S. Davis
Attorney, Agent, or Firm—Antonelli, Terry, Stout & Kraus

[57] ABSTRACT

Coded image data are supplied in the order of page units, and each page of the input coded image data is examined without being decoded as to whether it includes a predetermined coded separator pattern. If a separator sheet is included, that page is recognized as the coded image data of a separator sheet, and if a separator sheet is not included, that page is recognized as the coded image data of a document. Therefore, the document fed before the separator sheet and the document fed after the separator sheet can be classified to belong to different groups, and thus registered in different regions of a memory, respectively. Since the coded image data of documents can be classified without being decoded, a plurality of documents to be classified can be supplied even from a facsimile or the like to and registered in an electronic image filing system at a high speed. Accordingly, it is possible to provide an electronic system capable of hanging the transmission condition in accordance with the result of the recognition of the different types of documents.

8 Claims, 14 Drawing Sheets

FIG. 7A(1)
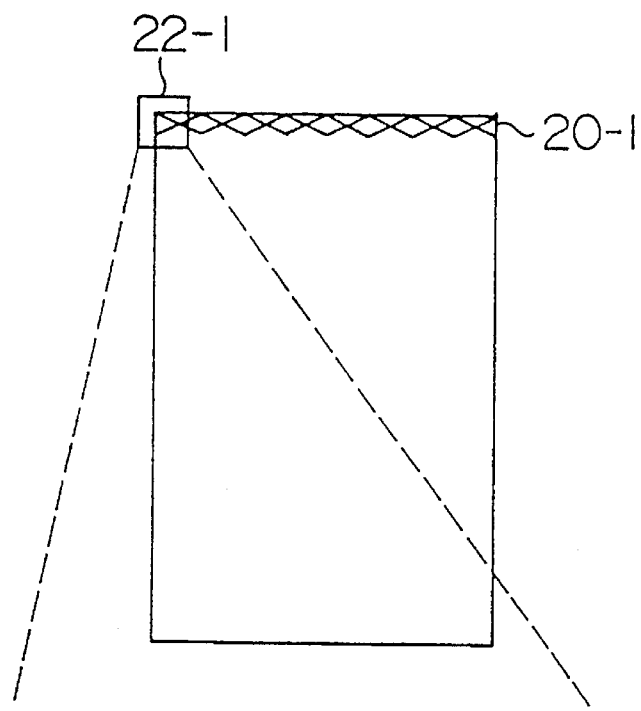
FIG. 7A(2)
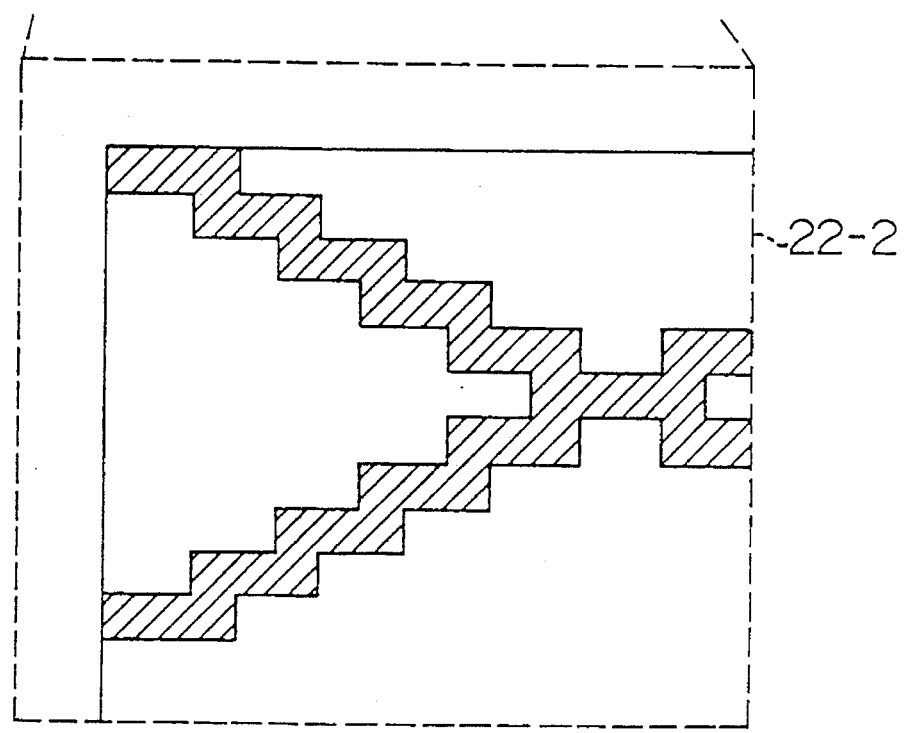

FIG. 7B

| H(0,3) | H(18,6) | ... | H(18,6) | H(1,0) | V(0) |

| VR2 | H(3,18) | VL2 | H(4,3) | ... |

FIG. 7C

| V0 | V0 | ... | V0 | ... |

METHOD AND APPARATUS FOR PROCESSING CODED IMAGE DATA

This application is a continuation application of Ser. No. 07/979,273, filed Nov. 20, 1992, now abandoned.

BACKGROUND OF THE INVENTION

This invention relates to a method and apparatus for processing coded image data, and particularly to a method and apparatus for processing coded image data including a plurality of different types of documents to be classified.

The publication, JP-A-61-248169, disclosed an image processing apparatus wherein picture information is divided by use of a predetermined pattern.

Recently, a large-capacity electronic image filing system has been widely used for document management.

When documents are registered in this electronic image filing system, the image data of documents are read in by use of image reading input means such as a scanner. When a plurality of documents which are desired to be classified and managed are registered together, a manuscript (hereinafter, referred to as a separator sheet) having a predetermined image pattern (hereinafter, referred to as a separator pattern) is inserted between the documents of different kinds, and the plurality of documents with the separator sheets inserted are continuously read in by such an image information processor as disclosed in JP-A-61-248169. At this time, the image information processor detects the separator pattern and assigns different management information to the documents before and after the separator sheet, so that the respective document image data can be classified and registered in the electronic image filing system.

When document image data are read in through a facsimile and registered in the electronic image filing system, the document image data are coded (compressed) by the system MH, MR, MMR or the like. When the read image is compressed by a compression-type scanner, the document image data are also coded. In addition, the document image data which are fed from a remote place through a communication network are also coded.

In the image information processor disclosed in the JP-A-61-248169, however, the separator pattern cannot be immediately detected from the coded document image data, and thus the coded document image data must be decoded before the separator pattern is detected. Therefore, the processing time becomes long.

SUMMARY OF THE INVENTION

Accordingly, it is an object of the invention to provide a method and apparatus for processing coded image data wherein even coded document image data can be classified in a short time.

It is another object of the invention to provide an electronic image filing system capable of classifying coded image data transmitted through a facsimile without decoding.

It is still another object of the invention to provide a method and apparatus for processing coded image data wherein coded image data can be quickly classified and registered, and which can be connected with and suitably utilize a facsimile, a compression-type scanner, communication circuits and so on as input units.

According to the invention, there is provided with a method for processing coded image data wherein certain units of coded image data are inputted in order and examined as they are, as to whether each unit includes a predetermined separator pattern in order for the documents before and after the separator sheet to be classified as different kinds, in which case if a separator sheet is included, that unit of the coded image data is decided to be of the separator sheet, and if a separator sheet is not included, that unit of the coded image data is decided to be of the document.

It can be examined as to which one of a plurality of predetermined modes matches with a pattern of the image data for this decision. The invention can provide an apparatus for processing coded image data which includes coded image data input means for inputting certain units of coded image data in order, coded separator pattern examining means for examining if each unit of coded image data inputted as they are includes a predetermined coded separator pattern, deciding/classifying means for deciding that unit of coded image data to be of the separator sheet if included or deciding it to be of the document if not included and classifying the documents before and after the separator sheet to be of different kinds or groups, and large-capacity storage means for storing coded document image data in memory regions in accordance with the classification.

According to the method for processing coded image data, each unit of the coded image data is examined as to whether it includes a predetermined coded separator pattern so that it is decided to be of the separator sheet or of the document.

Thus, since the coded document image data can be classified without being decoded, the documents to be classified as different kinds can be fed even from a facsimile or the like and quickly registered in the electronic image filing system.

According to the apparatus for processing coded image data, a plurality of documents to be classified as different kinds can be quickly stored in large-capacity storage means by utilizing the method for processing the coded image data, and thus a facsimile or the like can be suitably utilized as an input unit for documents.

BRIEF DESCRIPTION OF THE DRAWINGS

FIG. 7A shows an example of the separator sheet.

FIGS. 7B and 7C show patterns of the coded data of separator sheet and data sheet.

DESCRIPTION OF THE PREFERRED EMBODIMENTS

Embodiments of the invention will be described in detail with reference to the drawings. This invention is not limited to the embodiments.
(Embodiment 1)

In this embodiment, a plurality of documents with separator sheet inserted therebetween are supplied together to and registered/managed as different document files by an electronic image filing system.

Figure 1:
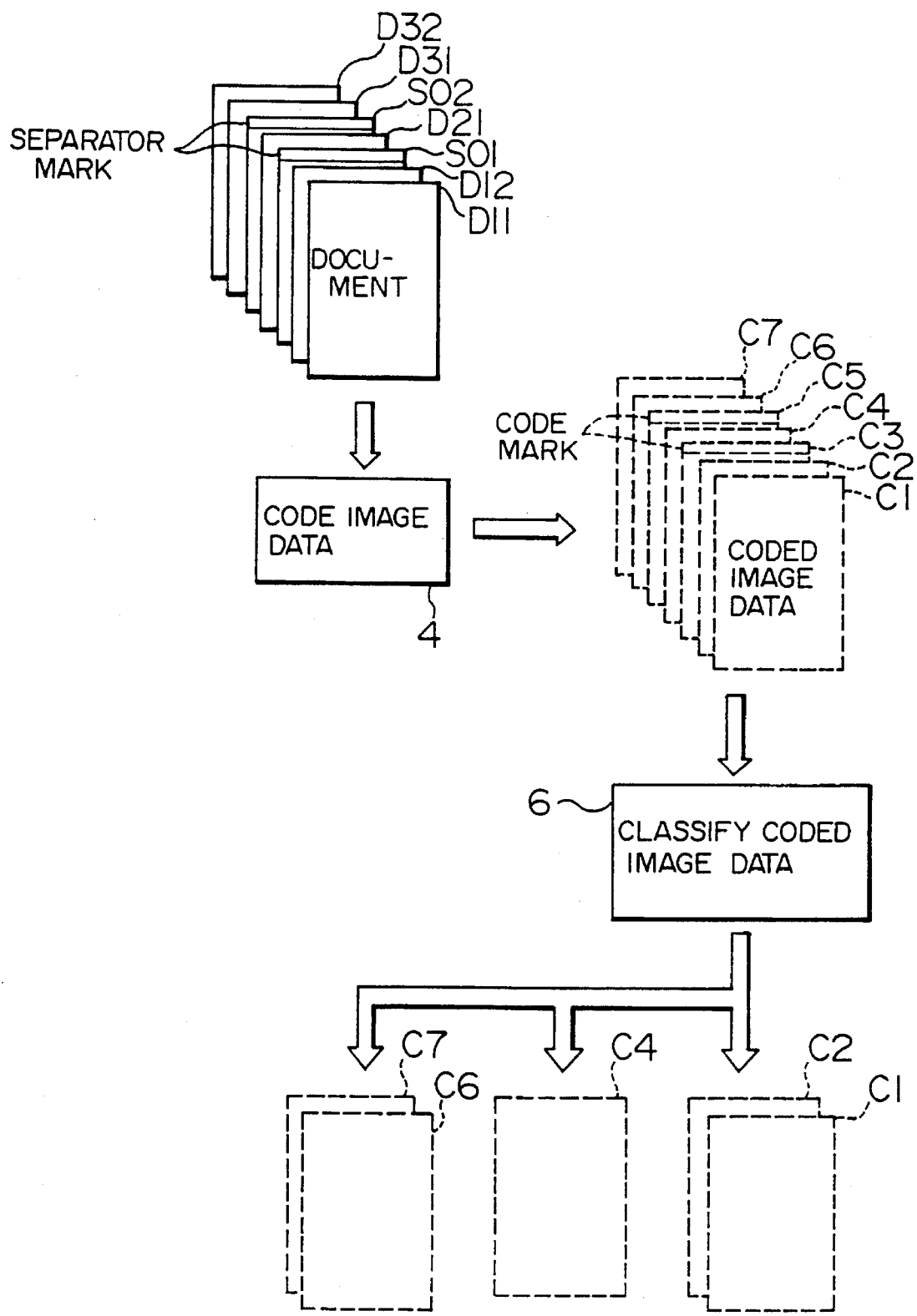
FIG. 1 is a diagram showing the outline of a method for processing coded image data according to this invention.

FIG. 1 shows the procedure for registering a plurality of documents being classified as different kinds, together into an electronic image filing system by utilizing the method for processing coded image data according to this invention. The documents D11, D12, document D21, and documents D31, D32 are to be classified as different kinds or groups. Thus, a separator sheet S01 and a separator sheet S02 are respectively inserted between the documents D12, D21 and between the documents D21, D31, and these documents and separator sheets are sequentially read in by electronic equipment for storing or transmitting the data, for example, a facsimile. The separator sheets S01 and S02 have a predetermined separator mark or pattern SM previously printed thereon. Then, an image data coding processor unit 4 of the facsimile produces coded image data C1 to C7 of sequential pages. The coded image data C3 and C5 corresponding to the separator sheets S01 and S02 respectively include a coded separator pattern CM corresponding to the separator pattern SM. This coded separator pattern CM is such a pattern as not to appear in the coded image data C1, C2, C4, C6, C7 corresponding to the documents D11, D12, D21, D31, D32. In other words, the separator mark or pattern SM on the separator sheets S01 and S02 is determined to meet this requirement.

The coded image data C1 to C7 are supplied to a coded image data classification processor unit 6. The successive coded image data C1 and C2 including no coded separator pattern CM can be decided as documents of the same kind or group by this processor unit 6. When the coded image data C3 including the coded separator pattern CM appears, the data of the documents before and after that separator data are decided to be of different kinds or groups, and thus the coded image data C4 including no coded separator mark or pattern CM is decided to be of the second kind or group. Then, since the coded image data C5 including the coded separator pattern CM appears, the data of the documents before and after that separator data are decided to be of different kinds, and thus the coded image data C6 including no coded separator pattern CM is decided to be of the third kind or group. Furthermore, since the coded image data C7 including no coded separator pattern CM follows, it is decided to be of the third kind or group. Thus, the coded image data C1 to C7 are classified as they are, or without being decoded.

Therefore, the electronic image filing system can produce different document files according to the coded image data C1, C2, coded image data C4, and coded image data C6, C7, and register these data in the files which are managed.

Figure 2:
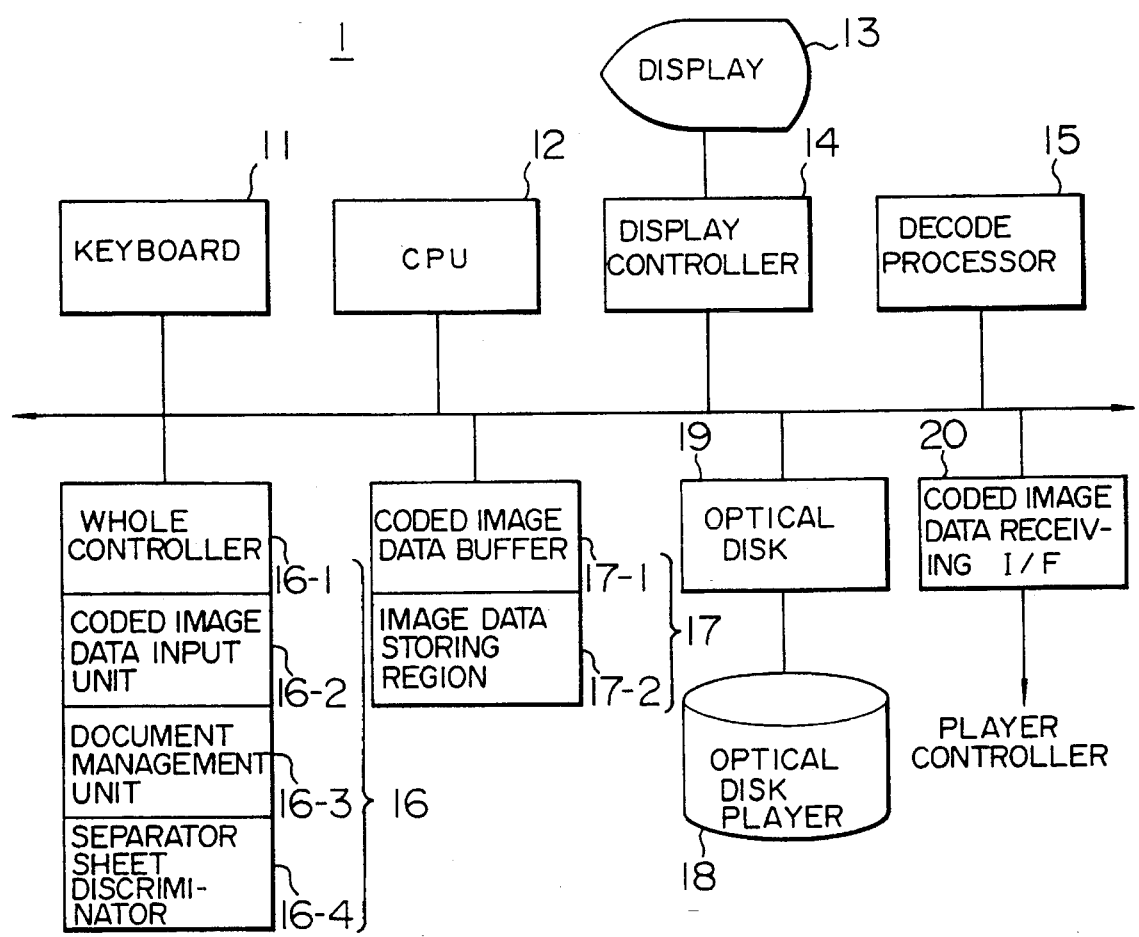
FIG. 2 is a block diagram of an electronic image filing system utilizing the method for processing coded image data according to this invention.

FIG. 2 shows an example of the construction of the electronic image filing system for classifying/registering/managing the coded image data in the above procedure. This electronic image filing system 1 includes a keyboard 11 for inputting a command or like, a CPU 12 for controlling the whole system, a display 13 for visually indicating the images of documents and separator sheets, a display controller 14 for controlling the display 13, a decoding (extension) processor 15 for decoding coded image data into image data (dot data), and a controlling memory 16 which is formed of a whole controller 16-1, a coded image data input unit 16-2, a document management unit 16-3 and a separator decision unit 16-4. The whole controller has a main program stored for executing the method of processing coded image data according to this invention. The coded image data input unit 16-2 has a program stored for executing the inputting of the coded image data. The document management unit 16-3 has a program stored for executing the management of document files such as document file production, document file registration and document file closing. The separator sheet decision unit 16-4 has a program stored for detecting the page corresponding to the separator sheet included in the input coded image data. The electronic image filing system further includes a data memory 17 which is formed of a coded image data buffer 17-1 for temporarily storing the coded image data, and an image data storing region 17-2 for temporarily storing the decoded image data, an optical disk apparatus 18 for storing the classified coded image data as document files, an optical disk apparatus controller 19 for controlling the optical disk apparatus 18, and a coded image data receiving interface 20 for receiving the coded image data from a facsimile, a compression-type scanner or a communication network.

Figure 3:
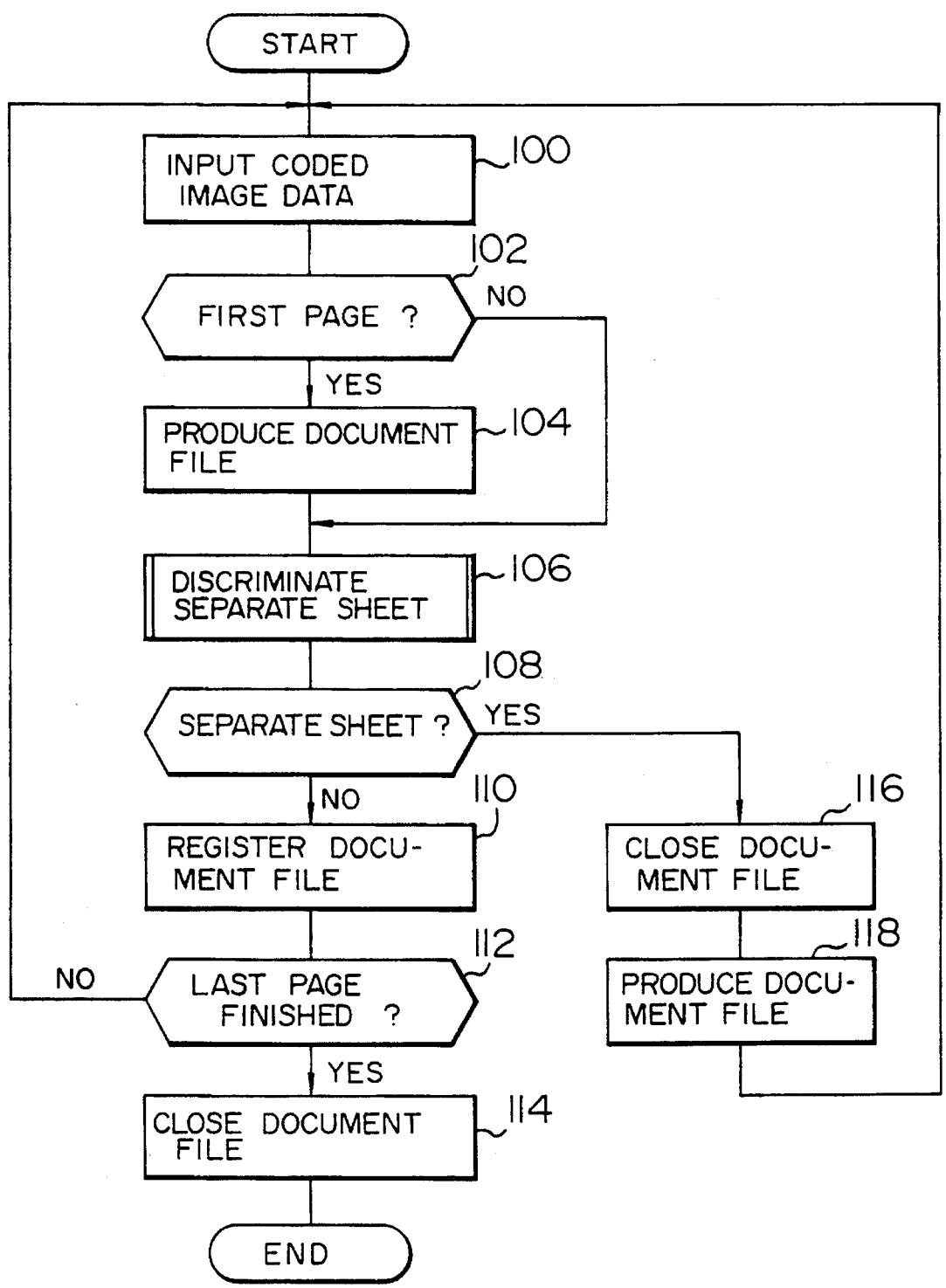
FIG. 3 is a flowchart of the operation of the electronic image filing system shown in FIG. 2.

FIG. 3 is a flowchart of the classification and registration of the coded image data by the electronic image filing system 1. These processing operations are performed by the whole controller 16-1, the coded image data input unit 16-2, the document management unit 16-3 and the separator sheet decision unit 16-4. At step 100, the pages or units of coded image data are supplied through the coded image data receiving interface 20 to the coded image data buffer 17-1. The input coded image data correspond to the pages of data C1 to C7 shown in FIG. 1. At step 102, decision is made of whether the input coded image data is the beginning, or first page. If it is the beginning, or first page, the program advances to step 104. If it is not the beginning page, the program advances to step 106. In this embodiment 1, since the separator sheet is sure to be inserted between the documents, the beginning page is not the separator sheet.

At step 104, a document file of a new kind is produced.

Figure 4:
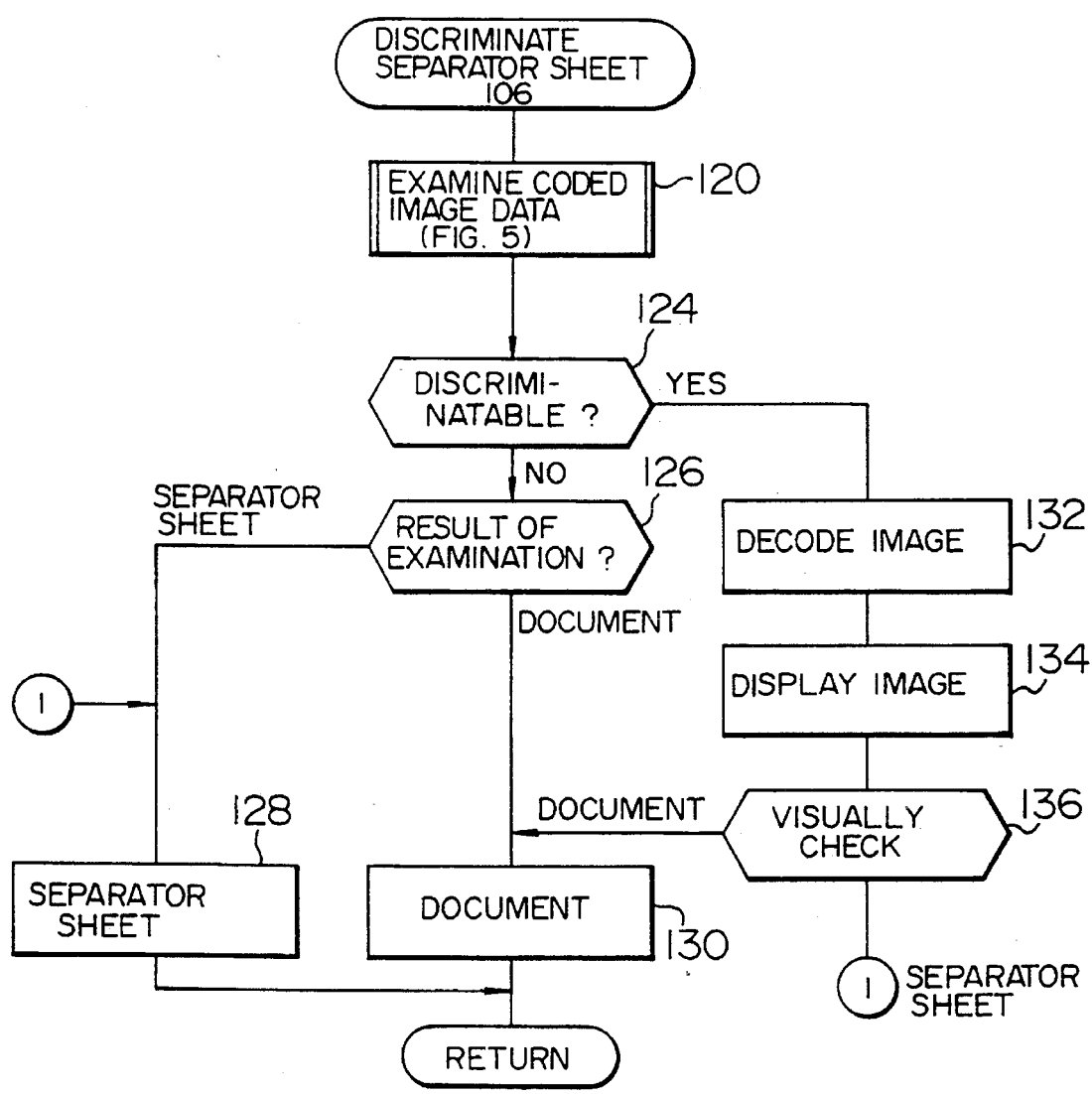
FIG. 4 is a flowchart for the separator sheet decision processing.
Figure 5:
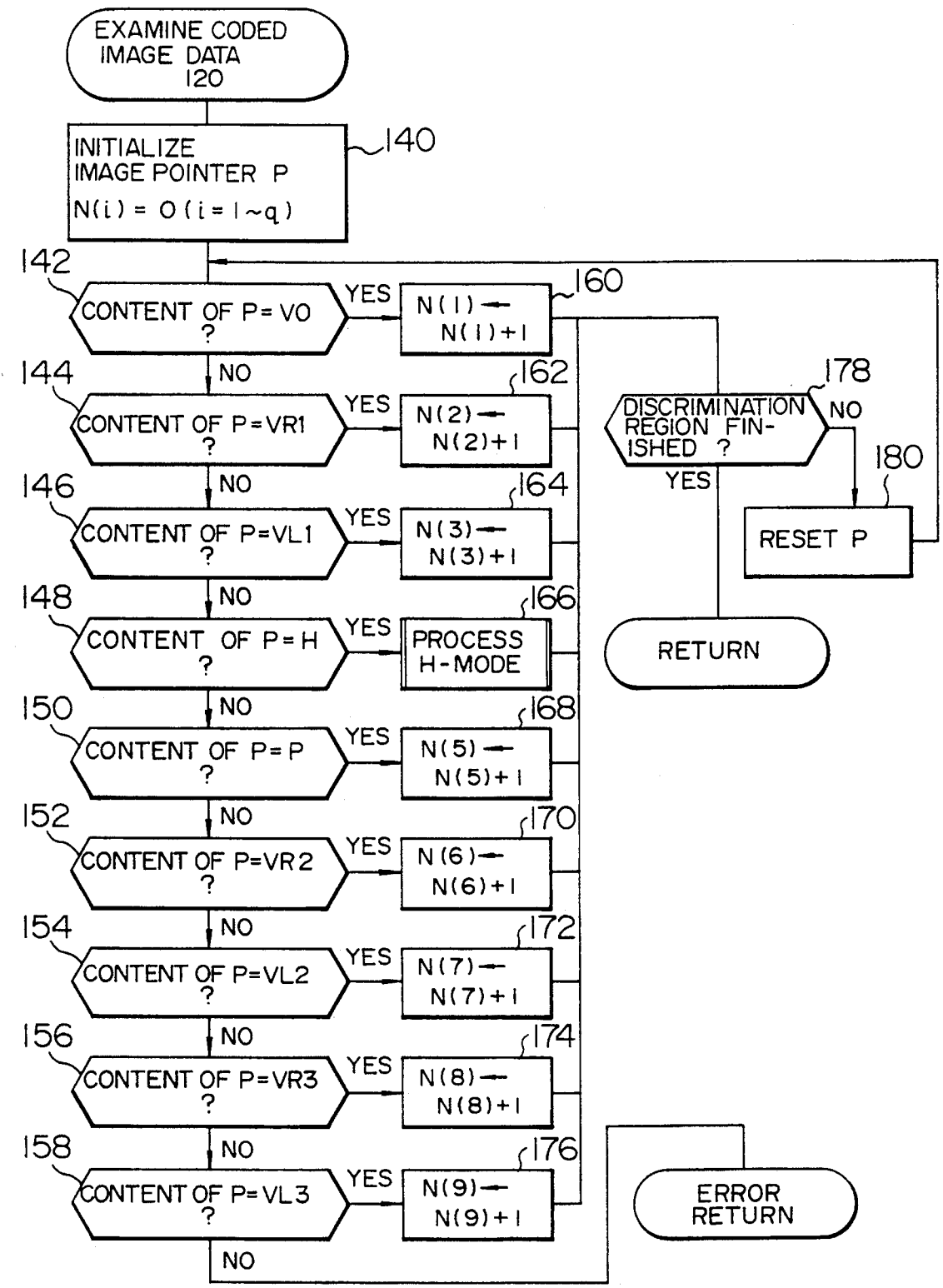
FIG. 5 is a flowchart for the coded image data examining processing.

At step 106, decision is made of whether the input coded image data is the separator sheet or a document. FIG. 4 is a detailed flowchart for the separate sheet decision processing. In FIG. 4, at step 120, coded image data is searched for, or examined within the decision region in which the coded separator pattern (CM in FIG. 1) exists. FIG. 5 is a detailed flowchart of the coded image data examining processing, or an example of examining the occurrence frequency MR-mode at each page. For the MR, MMR system, see Standardization of Group 3 Facsimile Apparatus for Document Transmission, T.4, Geneva, 1984, Facsimile Coding Schemes and Coding Control Function for Group 4 for Facsimile Apparatus, T.6, 1984.

At step 140, the image pointer P is initialized. The occurrence frequency counter N (i) (i=1 through 9) corresponding to each mode (VO mode through VL 3 mode) of MR code is initialized to be <0>.

At step 142, it is checked if the content of the image pointer P is VO mode. If it is VO mode, at step 160 the occurrence frequency counter N (1) corresponding to VO mode is incremented by <1>.

Similarly, at steps 144, 146, it is checked if the content of the image pointer P is VR1 mode, VL1 mode, respectively. If it is so, at step 162, 164, the occurrence frequency counter N(2), N(3) is incremented by <1>.

Figure 6:
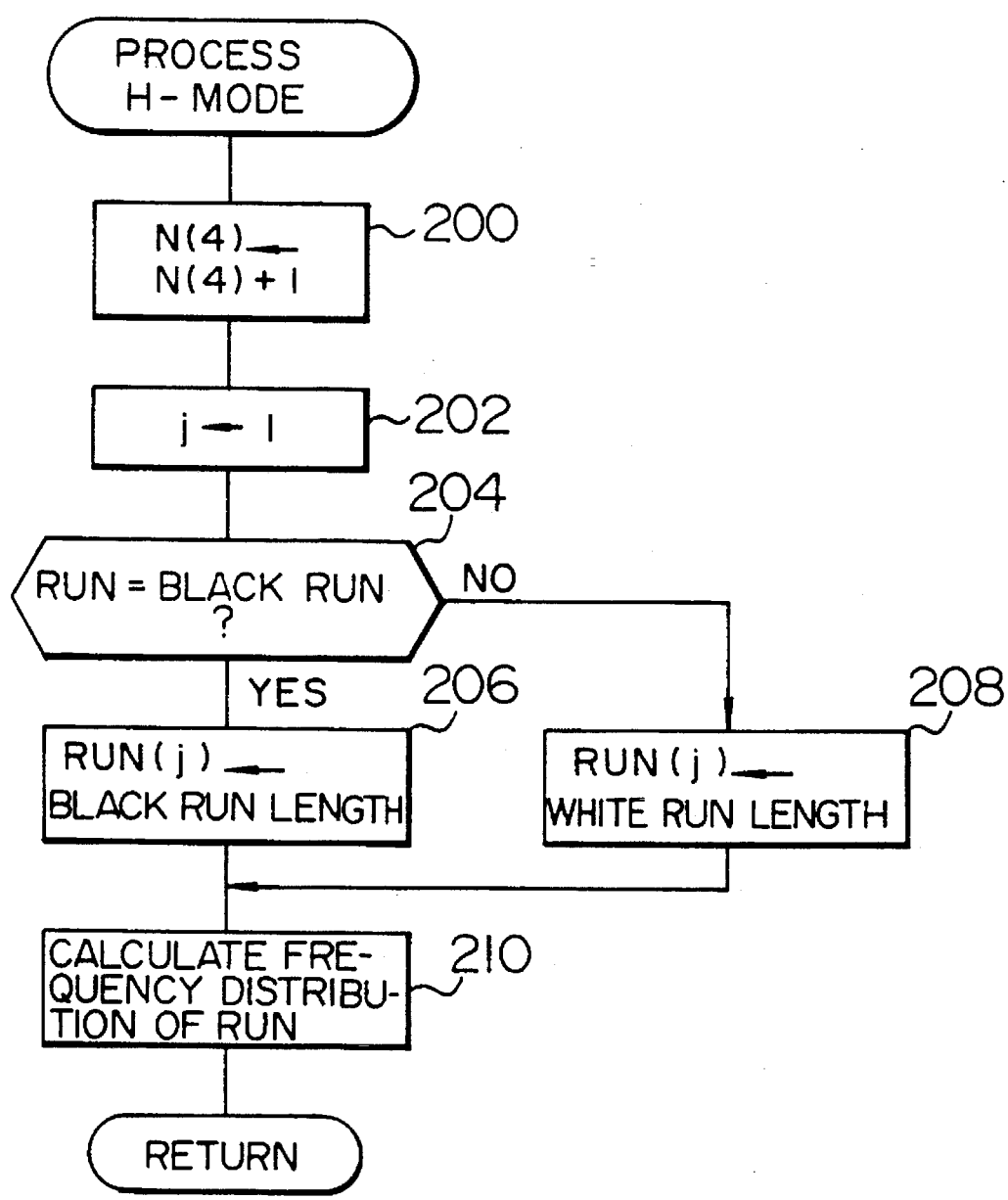
FIG. 6 is a flowchart for the H-mode processing.

At step 148, it is checked if the content of the image pointer P is H (horizontal)-mode. If it is H-mode, at step 166 the H-mode processing is performed. FIG. 6 is a detailed flowchart of the H-mode processing. In FIG. 6, at step 200, the occurrence frequency counter N (4) is incremented by <1>. At step 202, the run counter pointer j is initialized to be <1>. At step 204, decision is made of whether the content of the image pointer P indicates black run. If it is black run, the program goes to step 206. If it is not black run, the program goes to step 208. At step 206, a black run length is substituted into the run counter RUN (j). At step 208, a white run length is substituted into the run counter RUN (j). At step 210, the frequency distribution for each color and length of the run is calculated by the run counter RUN (j). Then, the program goes to the return step.

Referring back to FIG. 5, at step 150, it is checked if the content of the image pointer P is P(path) mode. If it is P-mode, at step 168 the occurrence frequency counter N (5) corresponding to P-mode is incremented by <1>.

Figure 8A:
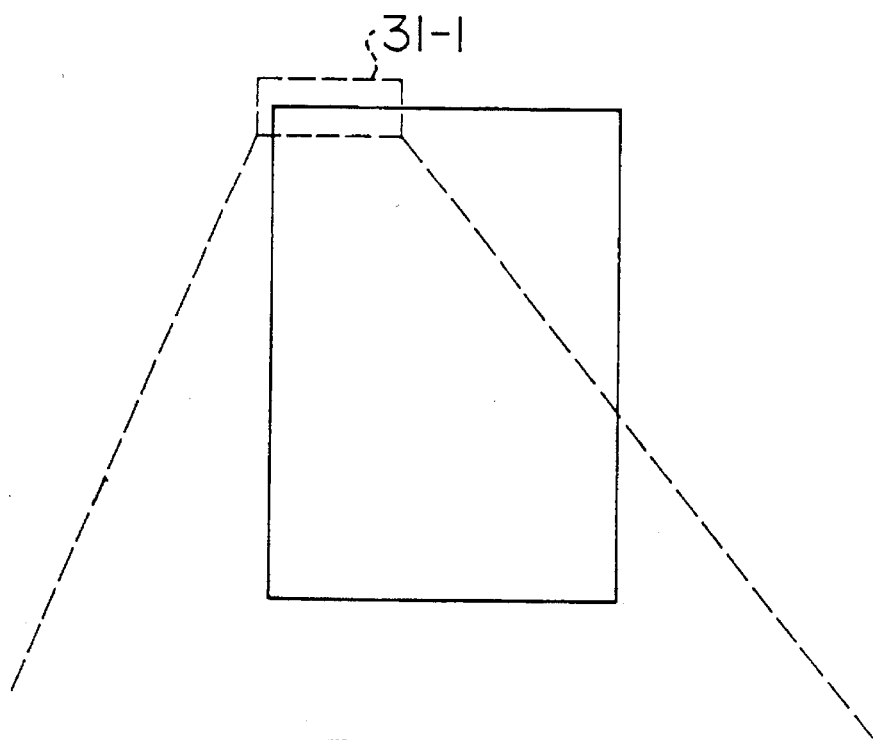
FIG. 8 shows another example of the separator sheet.
Figure 8B:
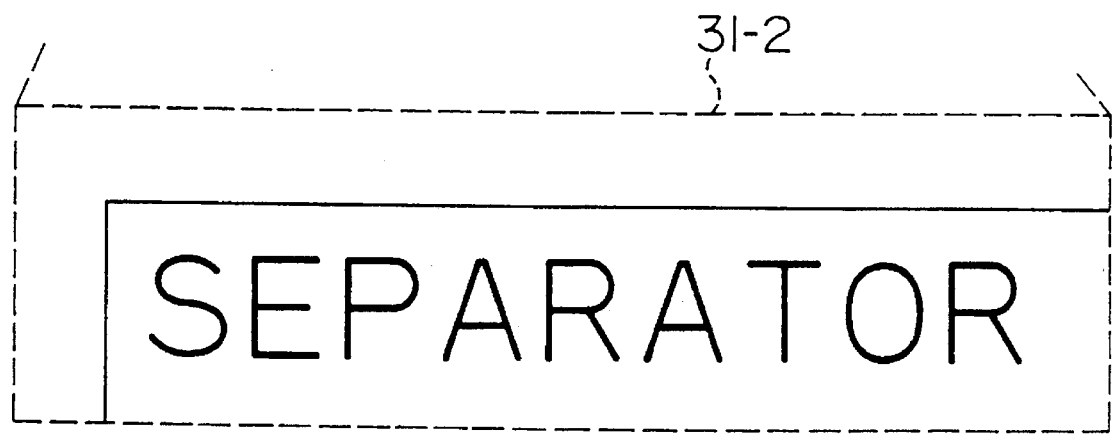

Similarly, at steps 152, 154, 156, 158, it is checked if the content of the image pointer P is VR2 mode, VL2 mode, VR3 mode, VL3 mode, respectively. If it is each mode, at step 170, 172, 174, 176 the occurrence frequency counter N(6) through N(9) is incremented by <1>. When the content of the image pointer P does not correspond to any mode, the program goes to the error return step. At step 178, it is checked if the decision region has been finished. If it is not finished yet, the program goes to the step 180. If it has been finished, the program goes to return step. At step 180, the image pointer P is reset. Then, the program goes to step 142. FIGS. 7 and 8 show an example of the separator sheet with MR code by which the documents can be discriminated from the separator sheet. FIG. 7 shows an example of the general-purpose separator sheet. In FIG. 7, 20-1 represents the region on which a separator pattern 22-1 is printed. Shown at 22-2 is a magnification of the separator pattern 22-1. The shaded area shows the black picture elements.

FIG. 7B shows an example of codes appearing when the image of the separator mark with no tilt and noise is inputted in the condition shown in FIG. 7A. FIG. 7C shows an example of codes appearing in the general document written on a sheet of paper with an upper blank, or margin.

As shown in FIG. 7B, a plurality of H-modes, H(0,3), H(18,6), . . . , H(18,6) appear on the first line of the control sheet, and VO-mode appears on the last line. On the second line, there appear VR2 mode at the beginning, and H mode H(3,18), VL2 mode, H mode H (4,3) and so on. The VO mode does not appear on the range of the region 20-1 on which the separator mark is printed except the end of each line.

As to the general document, the VO mode appears on the end of each line as shown in FIG. 7C. Therefore, with the general document, VO modes successively appear over the lines the number of which corresponds to the blank space.

When there are a tilt and noise, the occurrence frequency of each mode of MR code is examined over the region 20-1, thereby discriminating the separator sheet from others.

FIG. 8 shows an example of the separator sheet used when the documents to be inputted have blank space regions fixed previously. The separator sheet is produced by writing a separator pattern in the blank space region 31-1. The magnified view of the blank space region 31-1 is shown at 31-2. The separator pattern is a series of letters "separator" as shown.

Turning back to FIG. 4, at step 124 it is checked if the separator sheet can be discriminated by the result of the coded image data examination. If it can be discriminated, the program goes to step 126. If it cannot be discriminated, the program goes to step 132. At step 126, it is checked if the result of the coded image data examination is the separator or a document. If it is the separator, the program goes to step 128. If it is the document, the program goes to step 130. At step 128, the separator sheet is decided. Then, the program goes to the return step. At step 130, the document is decided. Then, the program goes to the return step. At step 132, the image data is decoded from the coded image data by the decode processor 15, and stored in the image data storing region 17-2. At step 134, the decoded image data is displayed as the image of that page on the display 13. At step 136, the image display on the display 13 is visually checked, and the keyboard 11 is operated to input the separator sheet or document. If the separator sheet is inputted, the program goes to step 128. If the document is inputted, the program goes to step 130.

Turning back to FIG. 3, at step 108, decision is made of whether the result of the separator discrimination is separator sheet. If it is not separator sheet, the program goes to step 110. If it is the separator sheet, the program goes to step 116. At step 110, the coded image data of this page is registered in the open document file. At step 112, it is checked if the last page of the coded image data has been completely registered. If it is not registered yet, the program goes to step 100. If it is already finished, the program goes to step 114. At step 114, the open document file is closed. Then, the program ends. At step 116, the open file is closed. At step 118, a document file is produced for a different group. Then, the program goes back to step 100. Thus, the coded image data inputted together can be separated without being decoded, registered in each document file and managed.

(Embodiment 2)

An embodiment 2 of the invention is an example for the registration/management of document files with index added. The index information is added to the title page at the beginning of the document or to the separator sheet.

Figure 9A:
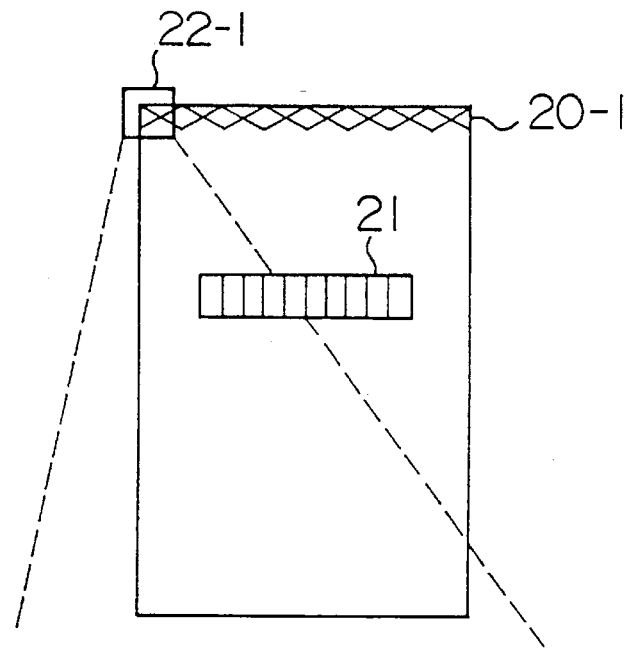
FIG. 9 shows a separator sheet including index information.
Figure 9B:
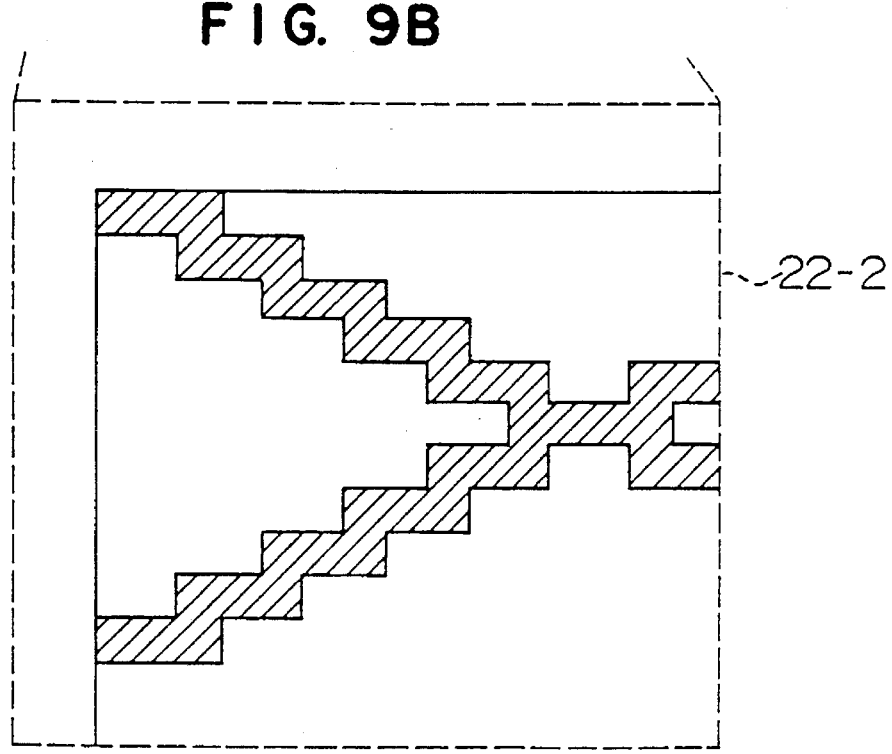

FIG. 9 shows an example of the separator sheet added with the index information. This corresponds to the addition of a handwritten letter frame field 21 to the separator sheet shown in FIG. 7. An index code is filled in the handwritten letter frame field 21.

Figure 10:
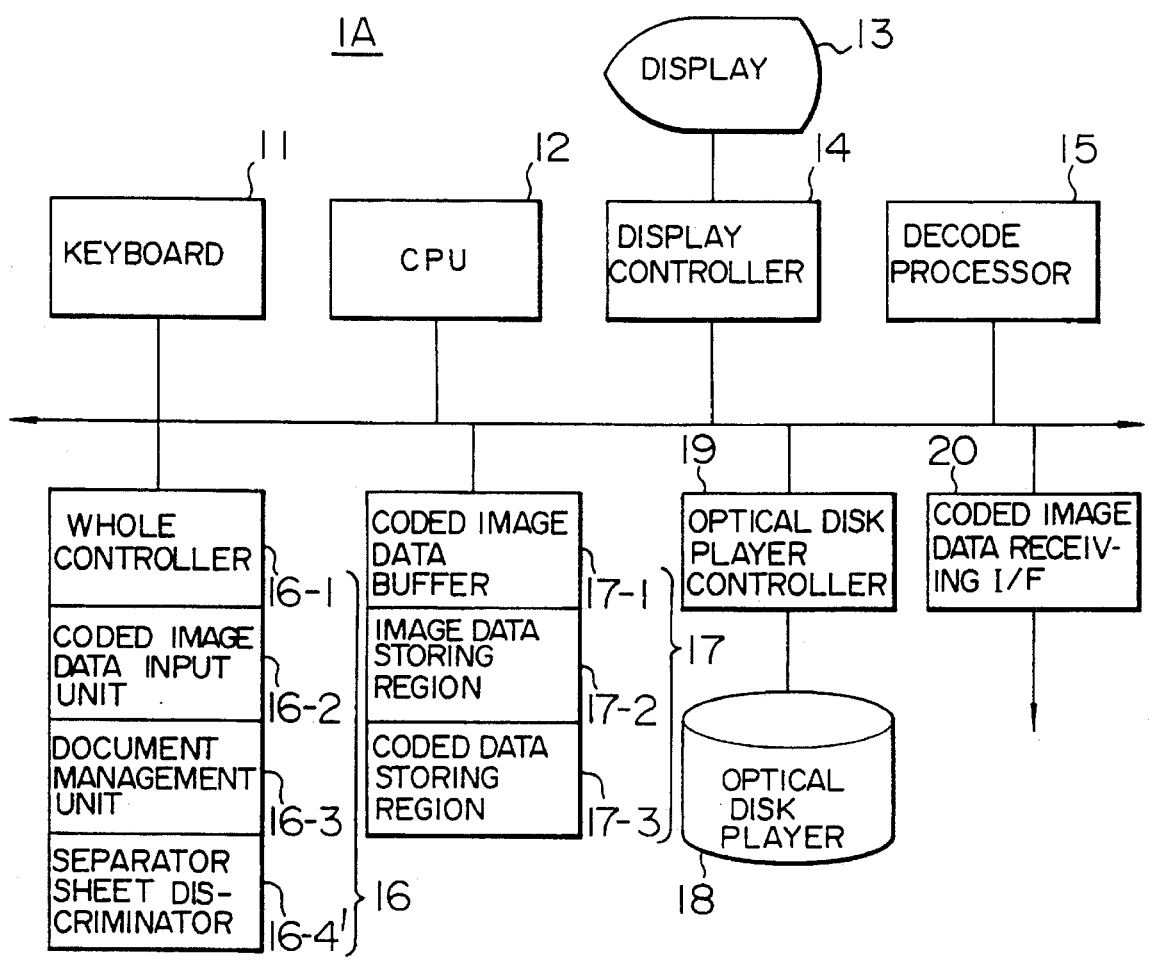
FIG. 10 is a block diagram of another example of the electronic image filing system utilizing the method for processing coded image data according to this invention.

FIG. 10 shows an example of the construction of the electronic image filing system of the embodiment 2.

This electronic image filing system 1A has substantially the same construction as the electronic image filing system 1 shown in FIG. 2, but different therefrom in the following points. The keyboard 11 is also used to input a code for modifying the index. The display 13 is also used for the confirmation and correction of the code of the index. The data memory 17 has also a coded data storing region 17-3 for storing the code of index. The optical disk player 18 adds the index to the document file and stores the index-added document.

Figure 11:
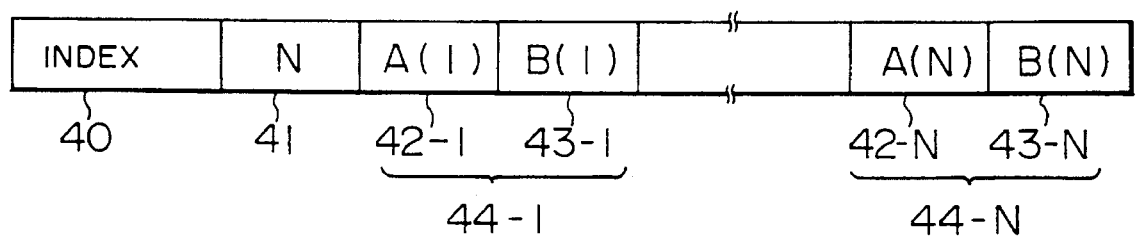
FIG. 11 shows the format of coded image data with index added.

FIG. 11 shows the format of the index-added document file. In FIG. 11, 40 represents an index field for storing the code of index, and 41 is a page number field for storing the number N of pages of the coded image data constituting this document file. Reference numeral 42-i (i=1 through N) is a head address field for storing the head address of the memory region which has stored the first page of the coded image data. Reference numeral 42-i (i=1 through N) is a region size field for storing the size of the memory region which has stored the first page of the coded image data.

Figure 12:
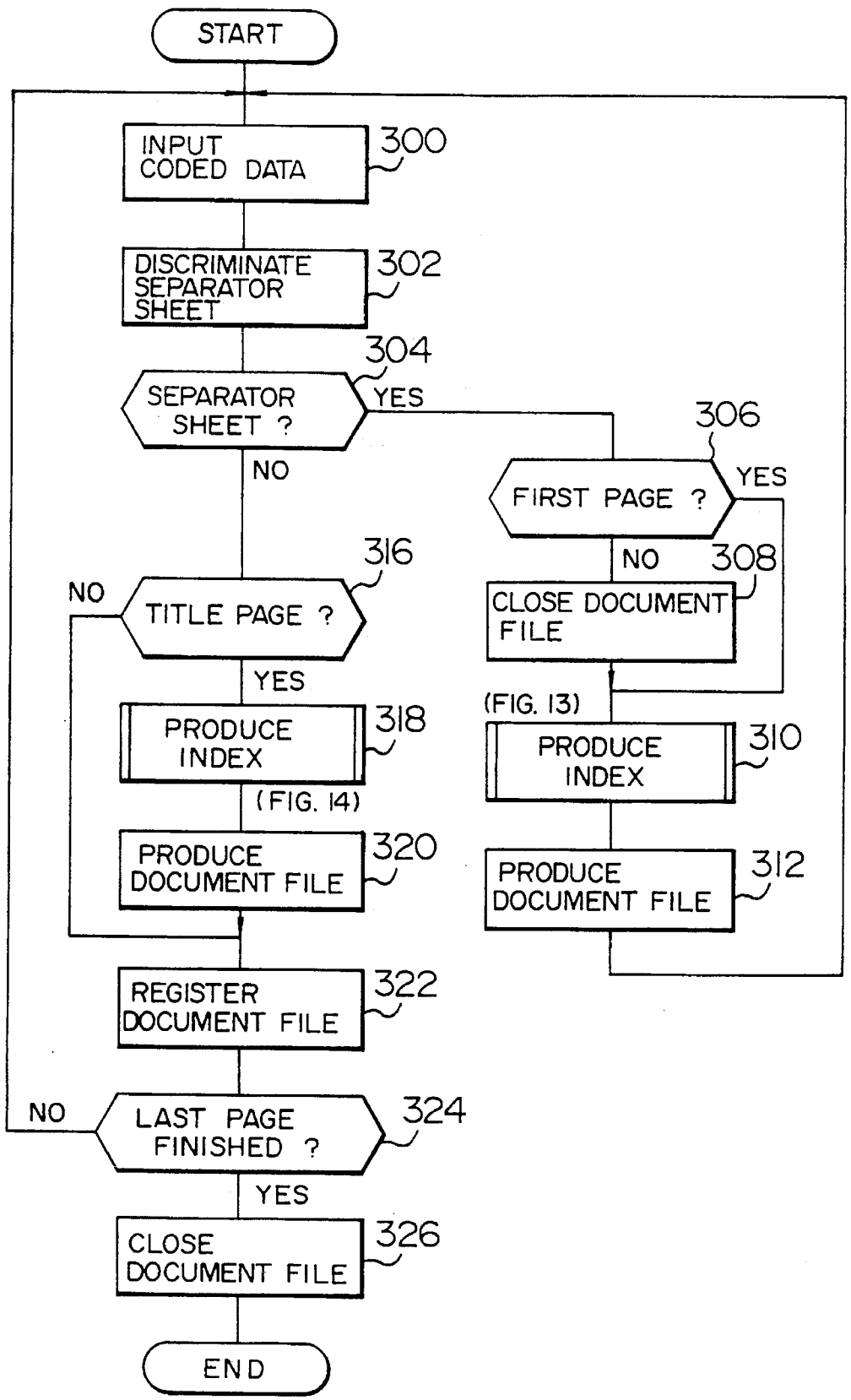
FIG. 12 is a flowchart of the operation of the electronic image filing system shown in FIG. 10.
Figure 13:
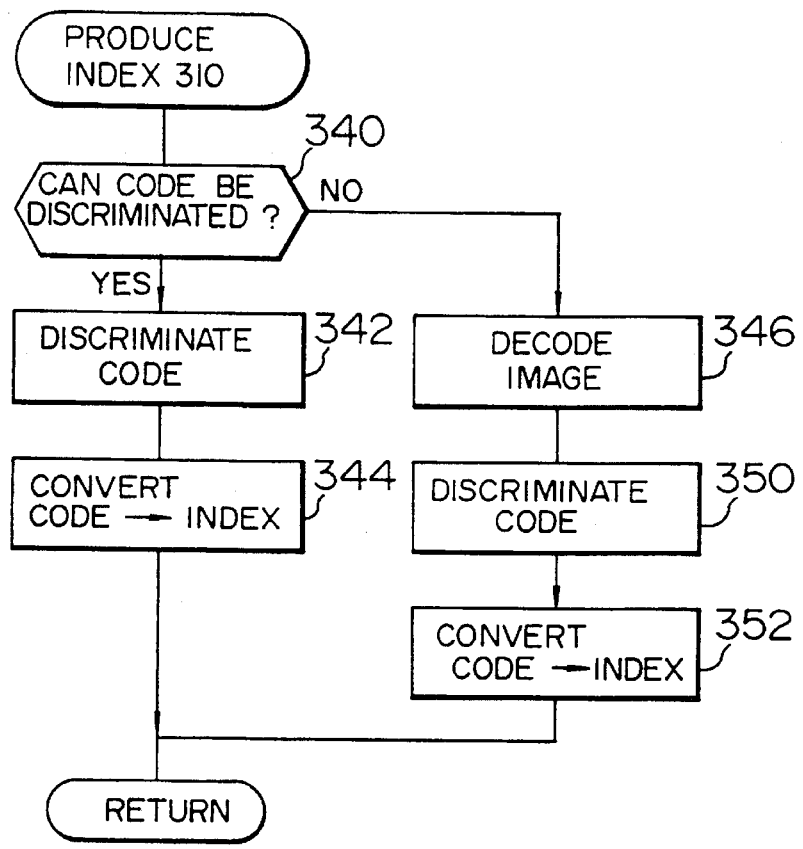
FIG. 13 is a flowchart of the index producing processing.

FIG. 12 is a flowchart for the coded image data classification and registration to be executed by the electronic image filing system 1A. At step 300, the coded image data are supplied page by page through the coded image data receiving interface 20 to the coded image data buffer 17-1. In the embodiment 2, the separator sheet can be inserted between the documents, and added to the beginning page (may not be added thereto). In addition, it is necessary to add the index information to the first page of each document or to the separator sheet placed therebefore. At step 302, the separator sheet discrimination processing is performed as shown in FIGS. 4 through 6. At step 304, it is checked if the result of the separator sheet discrimination processing is the separator sheet. If it is not the separator sheet, the program goes to step 314. If it is the separator sheet, the program goes to step 306. At step 306, decision is made of whether the input coded image data is the first page. If it is not the first page, the program goes to step 308. If it is the first page, the program goes to step 310. At step 308, the open document file is closed. At step 310, the index production processing is performed. FIG. 13 shows the details of the index production processing.

In FIG. 13, at step 340, it is checked if the index code can be identified in the form of coded image data. If it can be identified, the program goes to step 342. If it cannot be identified, the program goes to step 346. At step 342, the code is identified from the coded image data. In this case, for example, the coded image data are divided into code units, and the code is identified from the occurrence frequency of each code unit. At step 344, the code is converted into an index by use of an index production dictionary such as a word dictionary. Then, the program goes to the return step. At step 346, the coded image data are decoded by the decode processor 15 into index information added image data, which are stored in the image data storing region 17-2. At step 350, the code is identified from the decoded image data. In this case, for example, the letter pattern registered in the dictionary is matched with the letter pattern to be identified, and the similarity is calculated. The identification exactness in this method can be increased by use of the word dictionary which has registered therein the words that can be used as an index at a high probability. At step 352, the code is converted into an index. Then, the program goes to the return step.

Figure 14:
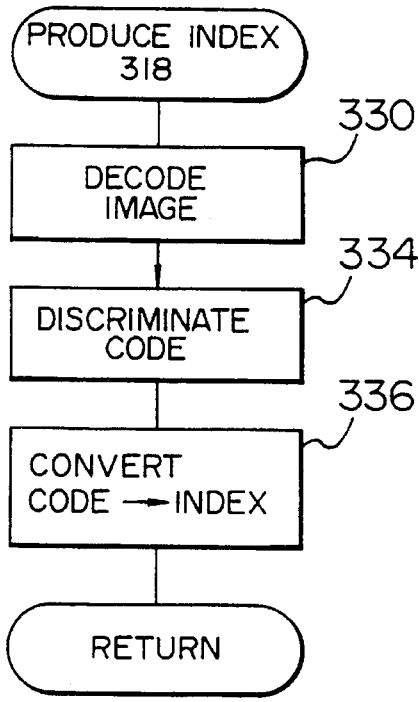
FIG. 14 is another flowchart of the index producing processing.

Turning back to FIG. 12, at step 312, a document file of a new group is produced by use of the index. Then, the program goes back to step 300. At step 316, it is checked if this page is the title page. If any document file is not opened, it is the title page. If some document file is opened, it is not the title page. If it is the title page, the program goes to step 318. If it is not the title page, the program goes to step 322. At step 318, the index production processing is performed. FIG. 14 shows the details of the index production processing.

In FIG. 14, at step 330, the coded image data is decoded by the decode processor 15 into the index information added image data, which are stored in the image data storing region 17-2. At step 334, the data is identified from the decoded image data as at step 350. At step 336, the code is converted into an index. Then, the program goes to the return step.

Turning back to FIG. 12, at step 320 a document file of a new group is produced by use of the index. At step 322, the coded image data of this page is registered in the open document file. At step 324, it is checked if the last page of the coded image data has been completely registered. If it is not finished yet, the program goes back to step 300. If it is already finished, the program goes to step 326. At step 326, the open document file is closed. Then, the program ends. Thus, the coded image data inputted together can be separated without being decoded, added with an index, registered in each document file and managed.

Thus, the classification of document image data can be realized by use of the occurrence frequency distribution of each mode as described above. It is also possible to change the transmission system for each region in accordance with the region attribute such as text, figure and photograph other than the classification of document image data.

Figure 15:
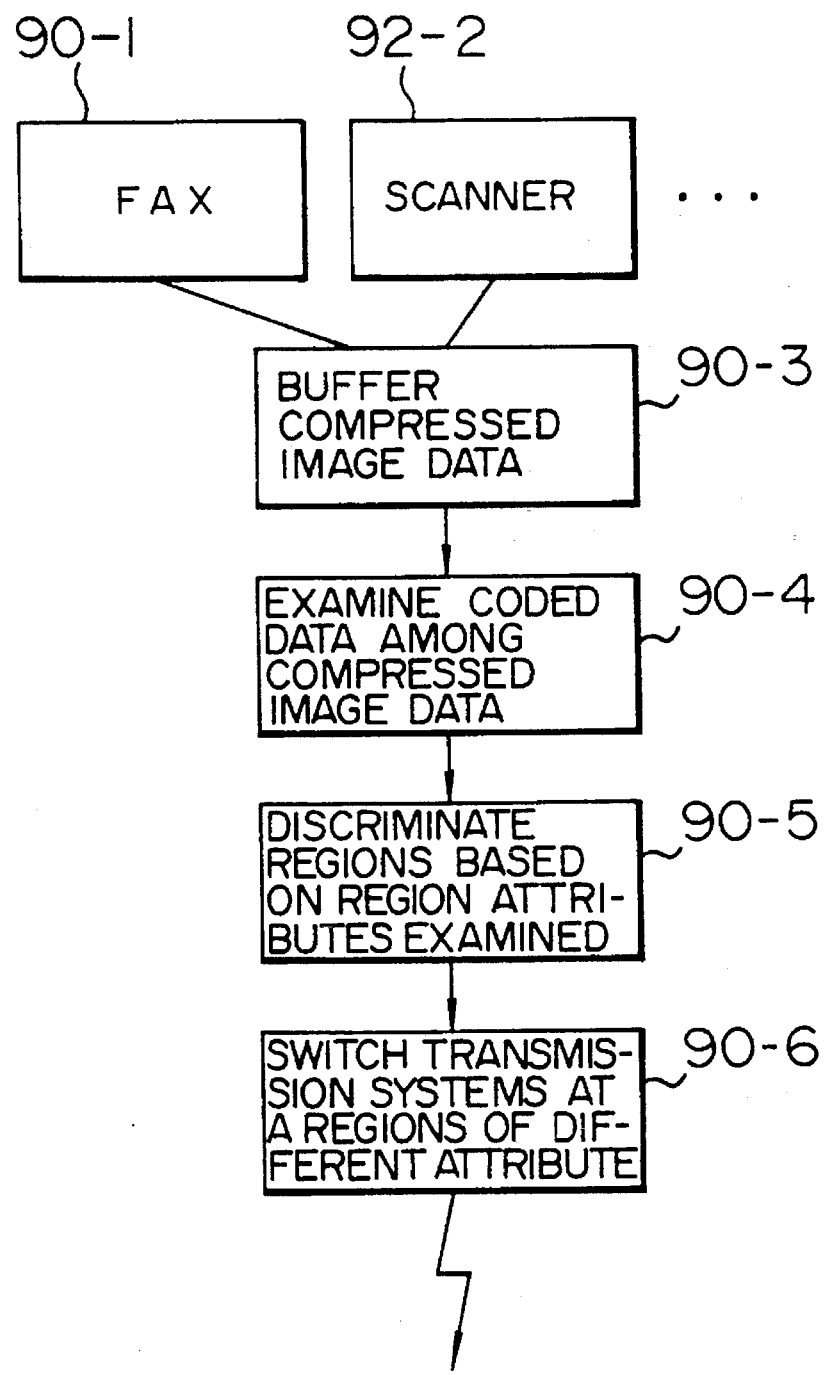
FIG. 15 is a flowchart of the procedure for deciding the occurrence frequency distribution of each mode, deciding a plurality of regions of image data and switching transmission systems.

FIG. 15 shows an example of the change of the transmission system by use of the occurrence frequency distribution of each mode. Shown at 90-1 through 90-2 are apparatus for inputting compressed image data. The apparatus for inputting compressed image data includes, for example, a facsimile for receiving compressed image data transmitted through a public network and a scanner for converting input image data into compressed image data. The input compressed image data is stored in a compressed image data buffer 90-3. A code data examiner 90-4 examines the occurrence frequency distribution of each mode for each region. A region discriminator 90-5 decides the region attribute of text, figure, photograph for each region on the basis of the examination result. A transmission system switch 90-6 changes the transmission system at each region. Thus, the transmission system can be changed for each region.

(Other embodiments)

While in the embodiments 1 and 2 only the coded image data of documents are registered/managed, the coded image data of the separator sheet may be registered/managed independently or together with the document data.

In addition, while in the embodiment 2 the index is produced from the code, the index may be produced from the figure.

Moreover, while in the second embodiment 2 the index is produced from the image data of index information, it is possible to receive the coded image data on the B-channel of ISDN, receive index information on D-channel, and produce the index from the received index information.

What is claimed is:

1. A method of processing and storing, in a coded form of a 2-dimensional compression-type sequential encoding scheme which has a plurality of encoding modes including a horizontal mode, a pass mode and a vertical mode, coded image data of human readable image data placed on a plurality of sheets, said sheets being designated into different groups by at least one separator sheet having a predetermined separator pattern thereon, comprising the steps of:

inputting, using an input apparatus, a plurality of blocks of input coded image data coded in said 2-dimensional compression-type sequential encoding scheme, and corresponding to said plurality of sheets;

examining, by a processor, which one of said plurality of encoding modes matches a compressively coded pattern of each code unit of said input coded image data, and calculating an occurrence frequency of each of said encoding modes in each data block of said input coded image data;

deciding, by said processor, if a frequency distribution of said occurrence frequency of said encoding modes in a data block of said input coded image data matches with a predetermined frequency distribution adopted for said predetermined separator pattern; and recognizing, by said processor, a presence of said predetermined separator pattern when the frequency distribution of said encoding modes in said data block is matched with that of said predetermined separator pattern, so that said processor manages and stores said coded image data separated before and after said matched block as different groups in a memory apparatus.

2. A method of processing and storing coded image data according to claim 1, wherein said predetermined separator pattern is image data of a pattern which is different from image data corresponding to a margin space of a document.

3. A method of processing and storing coded image data according to claim 2, wherein said predetermined separator pattern includes at least two substantially slant lines.

4. A method of processing and storing coded image data according to claim 1, wherein said predetermined separator pattern includes a combination of marks which have a potential to appear in said coded image data at a small probability in said coded form.

5. An apparatus for processing and storing in a coded form of a 2-dimensional compression-type sequential encoding scheme which has a plurality of encoding modes including a horizontal mode, a pass mode and a vertical mode, coded image data of human readable image data placed on a plurality of sheets, said sheets being designated into different groups by at least one separator sheet having a predetermined separator pattern thereon, comprising:

a means for inputting a plurality of blocks of input coded image data coded in said two dimensional compression-type sequential encoding scheme, and corresponding to said plurality of sheets;

a means for examining which one of said plurality of encoding modes matches a compressively coded pattern of each code unit of said input coded image data, and calculating an occurrence frequency of each of said encoding modes in each data block of said input coded image data;

a means for deciding if a frequency distribution of said occurrence frequency of said occurrence frequency of said encoding modes in a data block of said input coded image data matches with a predetermined frequency distribution adopted for said predetermined separator pattern; and a means for recognizing a presence of said predetermined separator pattern when the frequency distribution of said encoding modes in said data block is matched with that of said predetermined separator pattern; and a processor which, in response to a matched unit found in said means for deciding, manages and stores said coded image data separated before and after said matched data block as different groups in a storage apparatus.

6. An apparatus for processing and storing coded image data according to claim 5, wherein said predetermined separator pattern is image data which is different from image data corresponding to a margin space of a document.

7. An apparatus for processing and storing coded image data according to claim 6, wherein said predetermined separator pattern includes at least two substantially slant lines.

8. An apparatus for processing coded image data according to claim 5, wherein said predetermined separator pattern includes a combination of marks which have a potential to appear in said coded image data at a small probability in said coded form.

* * * * *